US011539198B2

(12) United States Patent
Witherbee et al.

(10) Patent No.: US 11,539,198 B2
(45) Date of Patent: Dec. 27, 2022

(54) CABLE TRAY ISOLATION PAD (71) Applicant: Eaton Intelligent Power Limited, Dublin (IE)

(72) Inventors: Martin Lee Witherbee, Godfrey, IL (US); Bret Eilerman, Highland, IL (US); Patrick Keller, Glen Carbon, IL (US); Matthew T. Combes, Greenville, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 20 days.

(21) Appl. No.: 16/379,462

(22) Filed: Apr. 9, 2019

(65) Prior Publication Data

US 2020/0325634 A1 Oct. 15, 2020

(51) Int. Cl.
*H02G 3/00* (2006.01)
*H02G 3/04* (2006.01)
*B29C 45/00* (2006.01)
*F16B 37/04* (2006.01)
*H02G 3/06* (2006.01)

(52) U.S. Cl.
CPC ......... *H02G 3/263* (2013.01); *B29C 45/0001* (2013.01); *H02G 3/0406* (2013.01); *H02G 3/0456* (2013.01); *F16B 37/045* (2013.01); *H02G 3/0608* (2013.01)

(58) Field of Classification Search
CPC .... H02G 3/263; H02G 3/0456; H02G 3/0608; H02G 3/32; H02G 3/0437; H02G 3/0406; F16B 37/045; F16B 7/187; F16B 2200/20; F16B 2/065; F16B 2/12; E04B 9/006; E04B 9/067; E04B 9/26; E04B 2001/2415; F16L 3/26; F16L 3/23; Y02E 10/47

See application file for complete search history.

(56) References Cited

U.S. PATENT DOCUMENTS

| 2,354,802 | A | * | 8/1944 | Doke | ......... | E04B 5/10 403/281 |
| 2,386,386 | A | * | 10/1945 | Doke | ......... | E04B 5/10 403/252 |
| 2,439,220 | A | * | 4/1948 | Rothfuchs | ......... | E04B 5/10 403/387 |
| 2,712,917 | A | * | 7/1955 | Flora | ......... | F16B 5/0685 403/397 |
| 2,873,082 | A | * | 2/1959 | Gillespie | ......... | F16B 2/241 248/300 |
| 3,257,134 | A | * | 6/1966 | Boyd | ......... | B61D 17/10 403/279 |
| 3,387,872 | A | * | 6/1968 | Lovullo | ......... | E04B 9/005 52/714 |
| 3,589,660 | A | * | 6/1971 | Dunckel | ......... | F21V 21/02 248/343 |

(Continued)

FOREIGN PATENT DOCUMENTS

| DE | 2516159 A1 * | 10/1976 | ............. | E04B 9/26 |
| GB | 1329040 A * | 9/1973 | ............. | E04B 9/26 |
| KR | 10-1738450 B1 | 4/2017 | | |

*Primary Examiner* — Jonathan Liu
*Assistant Examiner* — Taylor Morris
(74) *Attorney, Agent, or Firm* — Stinson LLP (57) ABSTRACT

The present disclosure is directed to multi-functional isolation pads that can be used in combination with both clamp-on cable trays and guide-on cable trays without any user manipulation (e.g., folding) of the isolation pad.

11 Claims, 14 Drawing Sheets

(56) References Cited

U.S. PATENT DOCUMENTS

| | | | | |
|---|---|---|---|---|
| 3,780,973 A * | 12/1973 | Dalton, Jr. | .............. | E04B 9/006 248/342 |
| 3,858,996 A * | 1/1975 | Jarvis | .............. | F16B 2/241 403/353 |
| 3,960,350 A * | 6/1976 | Tardoskegyi | .............. | F16L 3/14 248/589 |
| 4,013,253 A * | 3/1977 | Perrault | .............. | F16L 3/2431 248/222.51 |
| 4,789,286 A * | 12/1988 | Laput | .............. | F16B 7/044 248/296.1 |
| 4,974,987 A * | 12/1990 | Smock | .............. | E04B 2/744 403/252 |
| 5,100,086 A * | 3/1992 | Rinderer | .............. | H02G 3/263 248/49 |
| 5,372,341 A * | 12/1994 | Witherbee | .............. | H02G 3/263 248/49 |
| 5,573,217 A * | 11/1996 | Garvey | .............. | B60R 7/05 248/316.7 |
| 5,580,014 A * | 12/1996 | Rinderer | .............. | H02G 3/0456 174/68.1 |
| 5,639,048 A * | 6/1997 | Bartholomew | .............. | F16L 3/26 248/49 |
| 5,769,365 A * | 6/1998 | Onishi | .............. | F16L 3/2431 248/49 |
| 5,971,686 A * | 10/1999 | Stewart | .............. | F16B 37/041 411/113 |
| 6,082,690 A * | 7/2000 | Durin | .............. | H02G 3/263 248/241 |
| 6,234,835 B1 * | 5/2001 | Bakker | .............. | H01R 13/73 439/553 |
| 6,365,830 B1 * | 4/2002 | Snider, Jr | .............. | H02G 3/0456 174/484 |
| 6,412,733 B1 * | 7/2002 | Grzemski | .............. | H02G 3/0437 248/218.4 |
| 6,463,961 B1 * | 10/2002 | Iizuka | .............. | F24F 13/0254 138/107 |
| 6,588,711 B2 * | 7/2003 | Onishi | .............. | F16B 37/045 248/221.11 |
| 6,643,900 B2 * | 11/2003 | Jahrling | .............. | A47B 55/02 24/336 |
| 6,724,637 B2 * | 4/2004 | Li | .............. | F16L 3/23 174/191 |
| 6,811,363 B1 * | 11/2004 | Minnich | .............. | F16B 37/044 411/104 |
| 6,971,623 B2 * | 12/2005 | Allmon | .............. | E04H 9/02 248/680 |
| 7,055,786 B2 * | 6/2006 | Garassino | .............. | H02G 3/263 248/220.22 |
| 7,250,574 B2 * | 7/2007 | Fox | .............. | H02G 3/0418 174/101 |
| 7,661,632 B2 * | 2/2010 | Caveney | .............. | H02G 3/263 248/74.2 |
| 7,903,924 B2 * | 3/2011 | Pollard, Jr. | .............. | H02G 3/0608 248/302 |
| 7,910,829 B2 * | 3/2011 | Sculler | .............. | H02G 3/0418 439/211 |
| 8,136,769 B2 * | 3/2012 | Cardin | .............. | F16L 3/26 248/49 |
| 8,263,863 B2 | 9/2012 | Young | | |
| 8,303,223 B2 * | 11/2012 | Rass | .............. | F16B 37/045 248/58 |
| 8,459,604 B2 * | 6/2013 | Smith | .............. | H02G 3/0608 248/300 |
| 8,480,330 B2 * | 7/2013 | Urban | .............. | F24S 25/61 403/387 |
| 8,596,009 B2 * | 12/2013 | Baxter | .............. | E04B 9/10 52/506.06 |
| 8,899,544 B2 * | 12/2014 | Meredith, Jr. | .............. | H02G 3/263 248/309.1 |
| 9,022,333 B2 * | 5/2015 | Chen | .............. | F16B 5/0621 248/228.4 |
| 9,209,609 B2 * | 12/2015 | Kellerman | .............. | H02G 3/0608 |
| 9,243,723 B2 * | 1/2016 | DeCesare | .............. | F16L 3/123 |
| 9,273,708 B2 * | 3/2016 | Urban | .............. | F16B 2/12 |
| 9,447,914 B2 * | 9/2016 | Neace | .............. | H02G 3/32 |
| 9,587,433 B2 * | 3/2017 | Sylvester | .............. | F16L 3/1211 |
| 9,670,949 B1 * | 6/2017 | White | .............. | F16B 9/026 |
| 9,793,693 B1 * | 10/2017 | Handler | .............. | H02G 3/0456 |
| 9,841,043 B2 * | 12/2017 | Tally | .............. | F16B 7/0486 |
| 10,253,905 B2 * | 4/2019 | Martin | .............. | H02G 3/32 |
| 10,309,554 B2 * | 6/2019 | Shelton | .............. | H02G 3/263 |
| 10,451,198 B2 * | 10/2019 | Lupsa | .............. | F16B 2/065 |
| 10,655,661 B2 * | 5/2020 | Nijdam | .............. | F16B 37/045 |
| 10,731,866 B2 * | 8/2020 | Heffel | .............. | F24C 15/16 |
| 10,847,960 B1 * | 11/2020 | Naugler | .............. | F16B 2/22 |
| 2005/0000723 A1 * | 1/2005 | Fox | .............. | H02G 9/04 174/95 |
| 2008/0111033 A1 * | 5/2008 | Eldridge | .............. | H02G 3/24 248/74.1 |
| 2008/0310913 A1 * | 12/2008 | Urban | .............. | F24S 25/33 403/404 |
| 2009/0235603 A1 * | 9/2009 | Bergman | .............. | E04B 9/245 52/506.08 |
| 2009/0294602 A1 * | 12/2009 | Korczak | .............. | H02G 3/30 248/74.2 |
| 2010/0193645 A1 * | 8/2010 | Merhar | .............. | F16B 37/045 248/65 |
| 2012/0211609 A1 | 8/2012 | Mandic | | |
| 2014/0061415 A1 * | 3/2014 | Hermey | .............. | H02G 3/263 248/297.31 |
| 2015/0285408 A1 * | 10/2015 | Cox | .............. | F16L 5/14 277/628 |
| 2015/0318816 A1 * | 11/2015 | Bleibler | .............. | F24S 25/617 52/698 |
| 2016/0018026 A1 * | 1/2016 | Shelton | .............. | H02G 3/263 248/65 |
| 2016/0025244 A1 * | 1/2016 | Tally | .............. | H02G 3/32 248/72 |
| 2016/0261232 A1 * | 9/2016 | Grushkowitz | .............. | F24S 30/425 |
| 2016/0282016 A1 * | 9/2016 | Ash | .............. | F16B 1/00 |
| 2018/0187411 A1 * | 7/2018 | Shang | .............. | H02S 20/20 |
| 2018/0266729 A1 * | 9/2018 | Dai | .............. | F24S 25/00 |
| 2018/0363807 A1 * | 12/2018 | Lupsa | .............. | F16B 7/044 |
| 2019/0074674 A1 * | 3/2019 | Martin | .............. | H02G 3/32 |
| 2019/0089141 A1 * | 3/2019 | Combes | .............. | H02G 3/0608 |
| 2020/0059075 A1 * | 2/2020 | Rouleau | .............. | H02G 3/32 |
| 2020/0355214 A1 * | 11/2020 | Schlenker | .............. | F16B 37/044 |
| 2021/0194228 A1 * | 6/2021 | Dhale | .............. | H02G 3/0406 |
| 2021/0332912 A1 * | 10/2021 | Rohder | .............. | H02G 3/0456 |

* cited by examiner

CABLE TRAY ISOLATION PAD

FIELD OF THE DISCLOSURE

The present disclosure generally relates to an isolation pad for a cable tray.

BACKGROUND

Isolation pads are used in conjunction with cable trays in order to separate the cable tray from the mounting support components. The separation of these components prevents galvanic reactions between dissimilar metals. The isolation pad is also typically used to reduce friction between these components. Typically, the configuration of the isolation pad must be changed on-site depending on whether guides or clamps are used to secure the cable tray on the mounting support components.

SUMMARY

In one aspect, an isolation pad for a cable tray generally comprises a pad body which is substantially planar. The pad body has opposite first and second longitudinal body portions. The first longitudinal portion is configured to be sandwiched between the cable tray and a mounting support. The second longitudinal body portion defines a fastener opening configured to receive a fastener therethrough. An isolation lip extends generally upward from the pad body at a location between the first and second longitudinal body portions. The isolation lip includes an upper portion which is generally planar and opposes the first longitudinal body portion. The pad body and the isolation lip are preformed and injection-molded to form an integral, one-piece structure.

In another aspect, a method of making an isolation pad for a cable tray generally comprises injection molding the isolation pad as a preformed and integrally formed, one-piece structure. The injection-molded isolation pad includes a pad body which is substantially planar. The pad body has opposite first and second longitudinal body portions. The first longitudinal portion is configured to be sandwiched between the cable tray and a mounting support. The second longitudinal body portion defines a fastener opening configured to receive a fastener therethrough. An isolation lip extends generally upward from the pad body at a location between the first and second longitudinal body portions. The isolation lip includes an upper portion which is generally planar and opposes the first longitudinal body portion.

In yet another aspect, an isolation pad for a cable tray generally comprises a pad body which is substantially planar. The pad body has opposite first and second longitudinal body portions. The first longitudinal portion is configured to be sandwiched between the cable tray and a mounting support. The second longitudinal body portion defines a fastener opening configured to receive a fastener therethrough. An isolation lip extends generally upward from the pad body at a location between the first and second longitudinal body portions. The isolation lip includes an upper portion which is generally planar and opposes the first longitudinal body portion. A tab extends generally downward from the pad body and is configured to be received in an open slot of a strut to inhibit rotation of the isolation pad on the strut.

BRIEF DESCRIPTION OF THE DRAWINGS

Corresponding reference characters indicate corresponding parts throughout the drawings.

DETAILED DESCRIPTION OF THE DISCLOSURE

Referring to FIGS. 1 to 4, one embodiment of an isolation pad constructed according to the teachings of the present disclosure is generally indicated at reference numeral 10. As explained in more detail below and can be understood from the drawings, the illustrated isolation pad 10 is designed and constructed so that it can be used to isolate a cable tray, e.g., a rail R of a cable tray, from a mounting support (e.g., a strut S, a beam B, or other mounting support) and from a hold-down device HD (e.g., a clamp, a guide, and/or a combination clamp/guide) without the user configuring, re-configuring, or changing the shape or configuration of the isolation pad. In other words, the shape and dimensions of the isolation pad 10, as sold or as delivered to the job site, can be used to isolate the cable tray from a selected one or either of a clamp or a guide. In this way, the user does not need to configure, re-configure, orient, or position the isolation pad 10 in different ways depending on whether a clamp or a guide is used.

The illustrated isolation pad 10 generally comprises a pad body, generally indicated at 12, which may be generally or substantially flat or planar, for example. The pad body 12 has a length L (FIG. 2) and opposite first and second longitudinal body portions 14, 18, respectively. As explained in more detail below and shown in FIGS. 5-14, the first longitudinal body portion 14 is designed and constructed to rest or lie on a mounting surface (e.g., upper surface) of the mounting support (e.g., a strut S and/or a beam B) and be disposed between the mounting support and a lower surface of one of the rails R of the cable tray. As such, the first longitudinal body portion 14 is configured as a support-isolating portion of the isolation pad 10. The illustrated first longitudinal body portion 14 defines a central opening 24 extending through the opposite faces of the portion. The second longitudinal body portion 18 is configured to extend outward, laterally away from the rail R of the cable tray. As explained in more detail below, the second longitudinal body portion 18 include a fastening opening 19 to facilitate fastening or coupling of the hold-down device HD to the isolation pad 10. Accordingly, the second longitudinal body portion 18 is configured as a fastening portion of the isolation pad 10.

Figure 8:
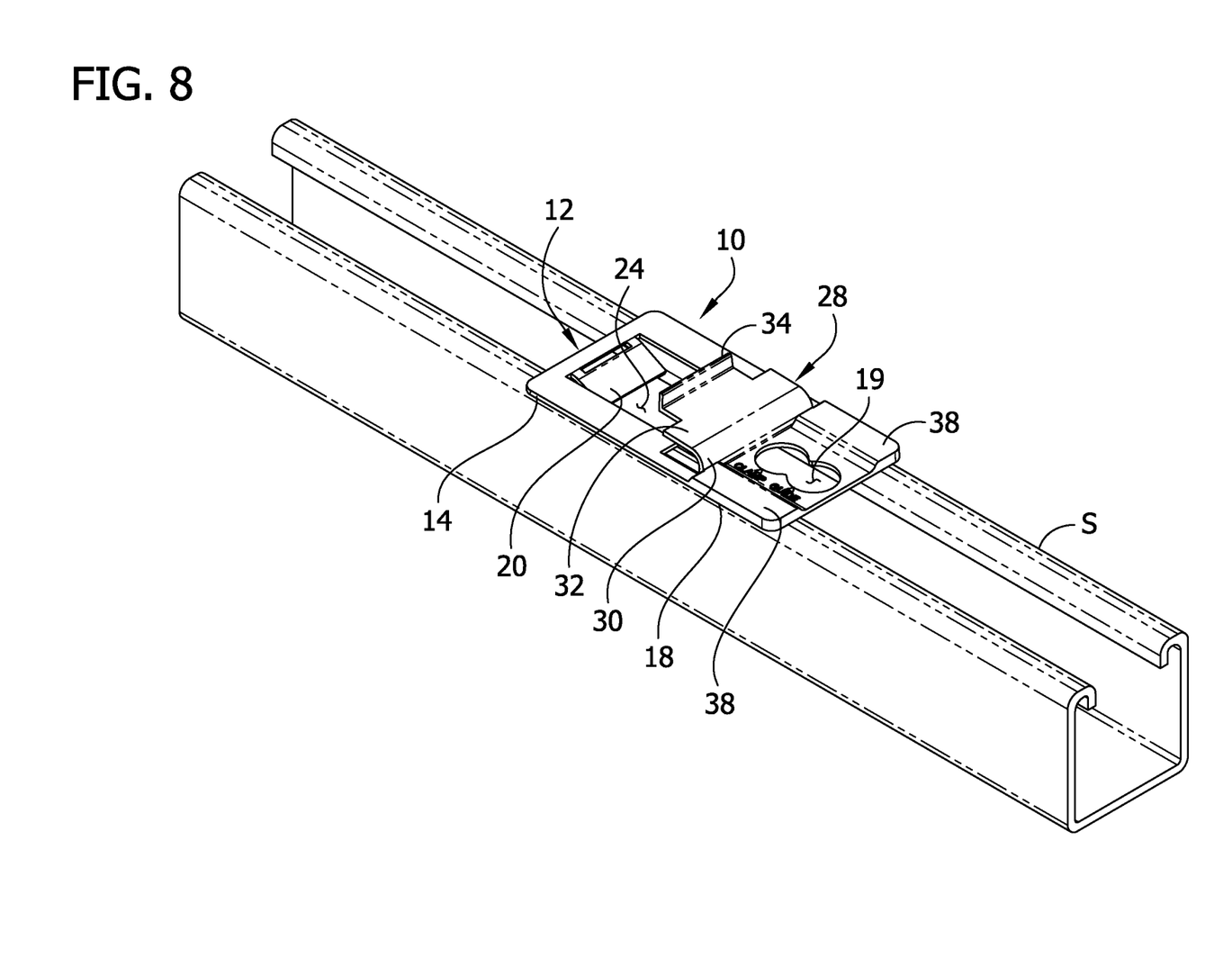
FIG. 8 is similar to FIG. 7, with the rail of the cable tray removed.
Figure 10:
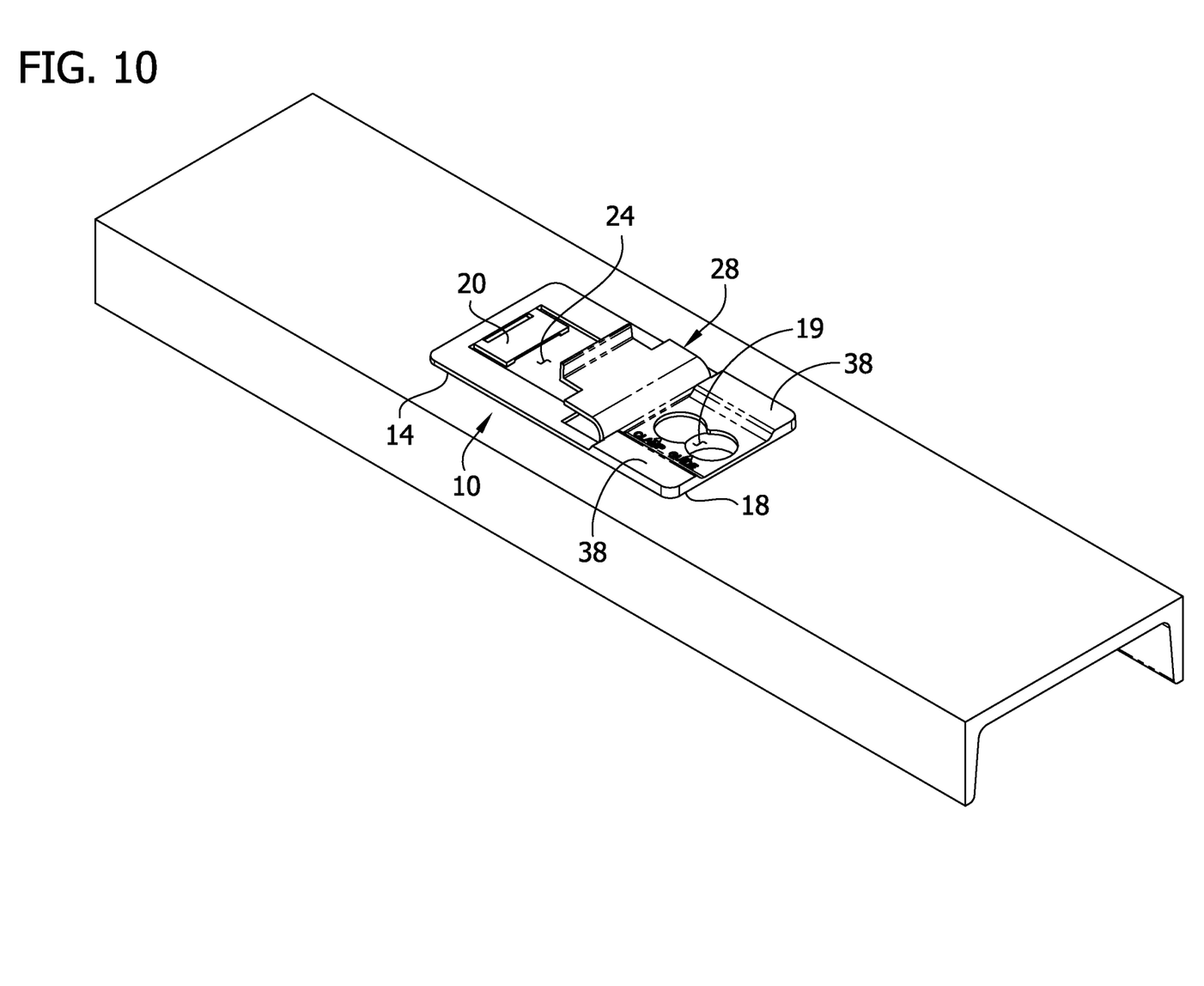
FIG. 10 is similar to FIG. 9, with the rail of the cable tray and the hold-down device removed.
Figure 11:
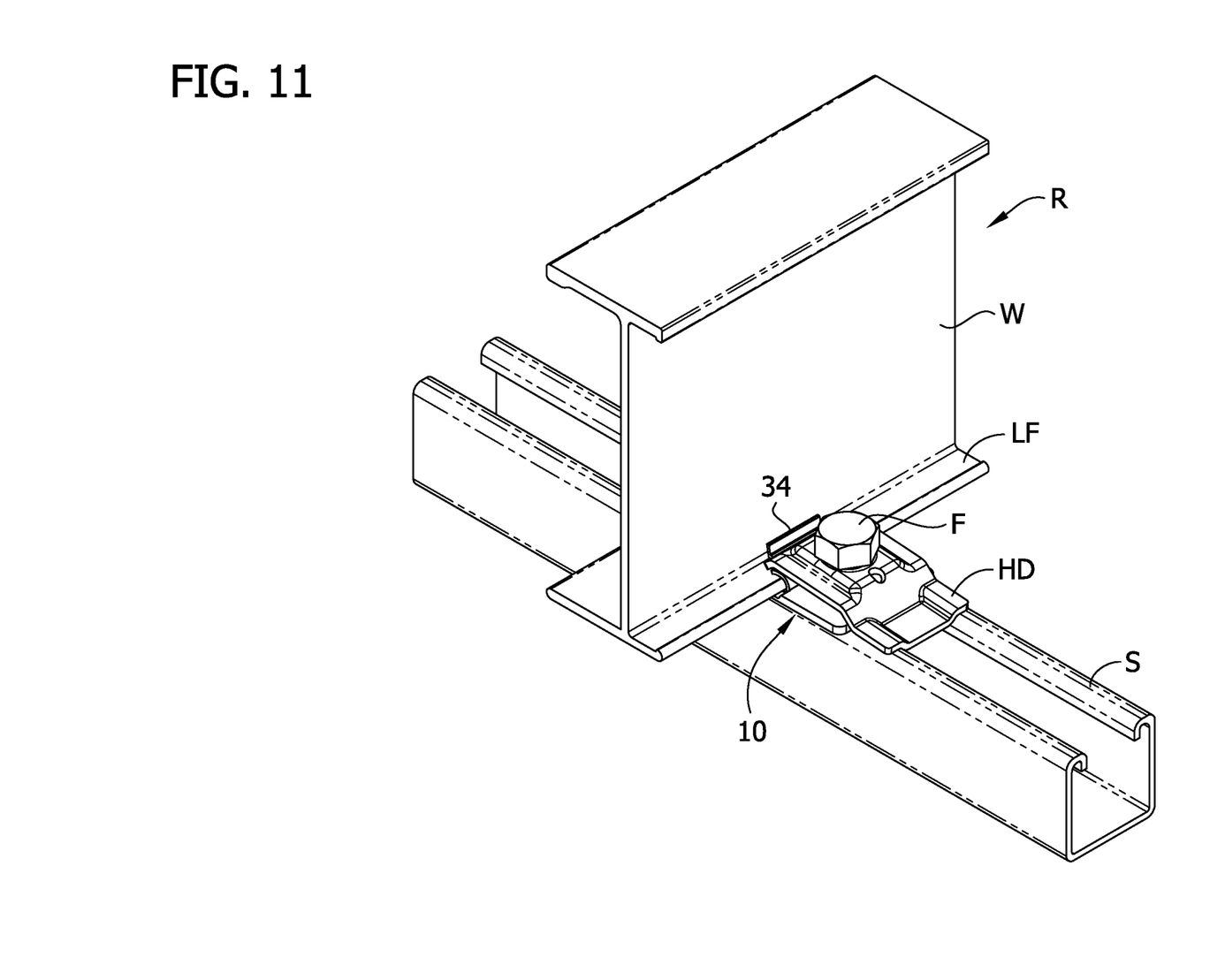
FIG. 11 is a perspective of a rail of cable tray supported on a strut, including the isolation pad separating or isolating the cable tray from the hold-down device in a clamp configuration and the strut.

A tab 20 is coupled (e.g., pivotably coupled, such as by a living hinge) to the pad body 12 (e.g., the first longitudinal portion 14), such as at an interior perimeter 22 defining the central opening 24. As can be seen from FIG. 3 in particular, the tab 20 extends generally downward from the first longitudinal body portion 14 at an angle (e.g., acute angle) relative to the first longitudinal body portion 14. The tab 20 can be disposed on the interior perimeter 22 nearest the first longitudinal end of the isolation pad 10 and directed generally toward the second longitudinal portion 18 of the isolation pad 10. As shown in FIG. 8, for example, the tab 20 may be sized and shaped so that it can be inserted and fit snugly into the open slot between upper lips of the strut S to prevent movement (e.g., rotation) of the isolation pad 10 on the strut. Thus, in various embodiments, the width of the tab 20 can be less than the width of the slot of the strut S. As shown in FIG. 10, for example, the illustrated tab 20 is pivotable in an upward direction to be generally planar with the first longitudinal body portion 14 and received in the central opening 24 when the isolation pad 10 is placed on a mounting support (e.g., the beam B) having a solid mounting surface (e.g., a solid, planar mounting surface). Broadly, the tab 20 is an alignment projection extending generally downward from the pad body 12. In one or more other embodiments, the alignment projection may be of other designs and/or constructions. For example, the alignment projection may be a rib or other projection and may or may not be pivotably coupled to the pad body 12.

Figure 6:
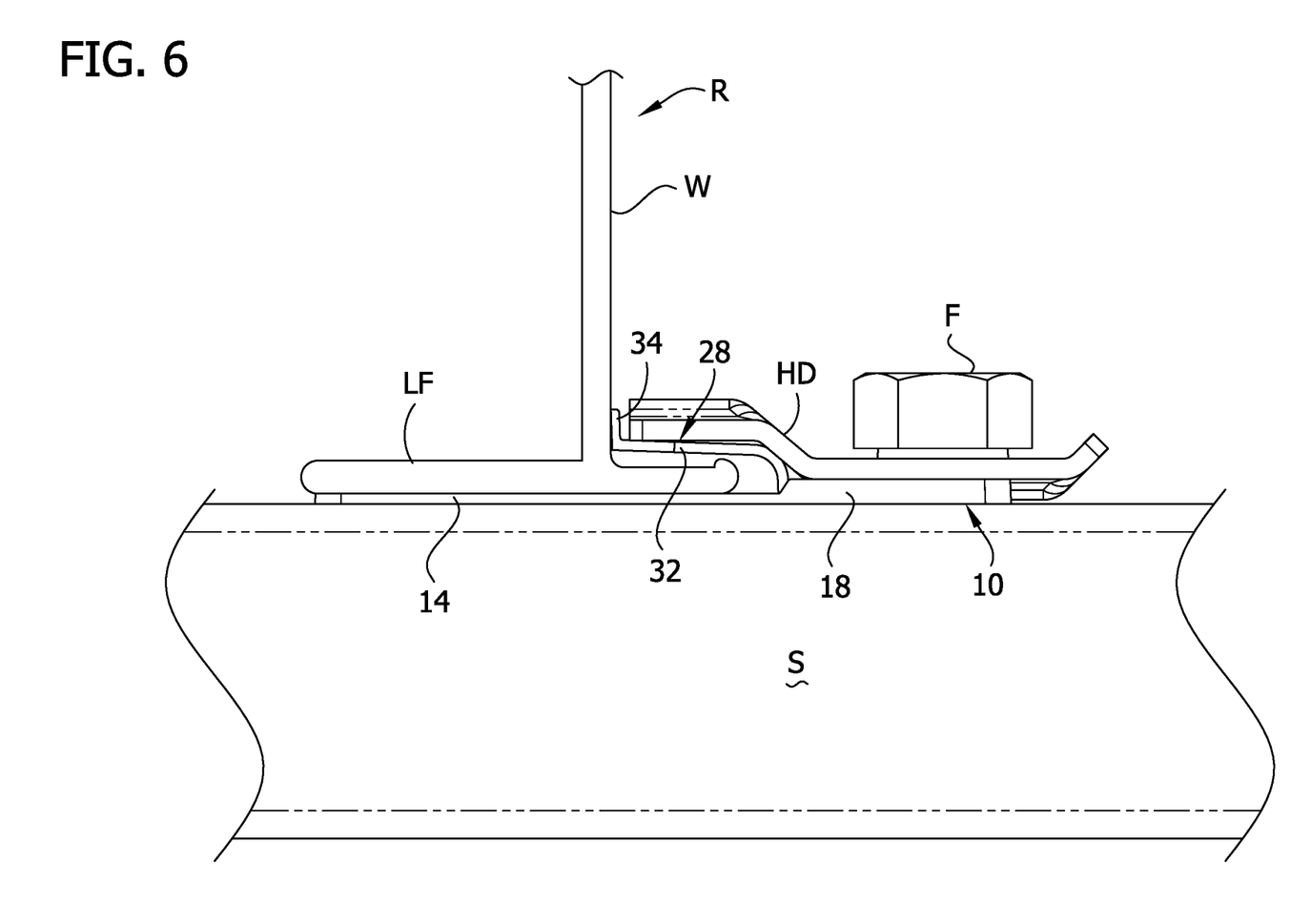
FIG. 6 is an enlarged, partial front elevational view of FIG. 5.
Figure 7:
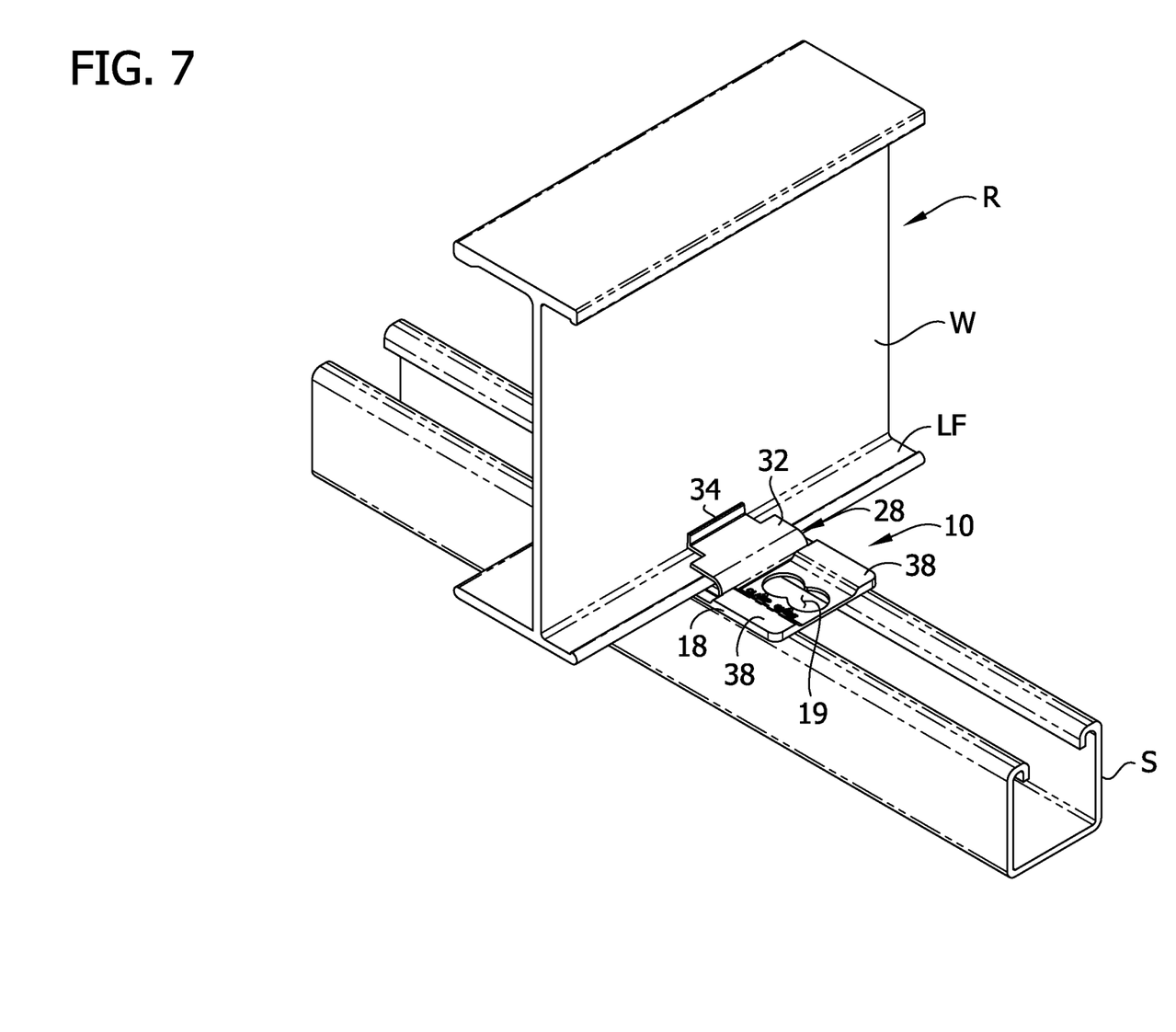
FIG. 7 is similar to FIG. 5, with the hold-down device removed.
Figure 12:
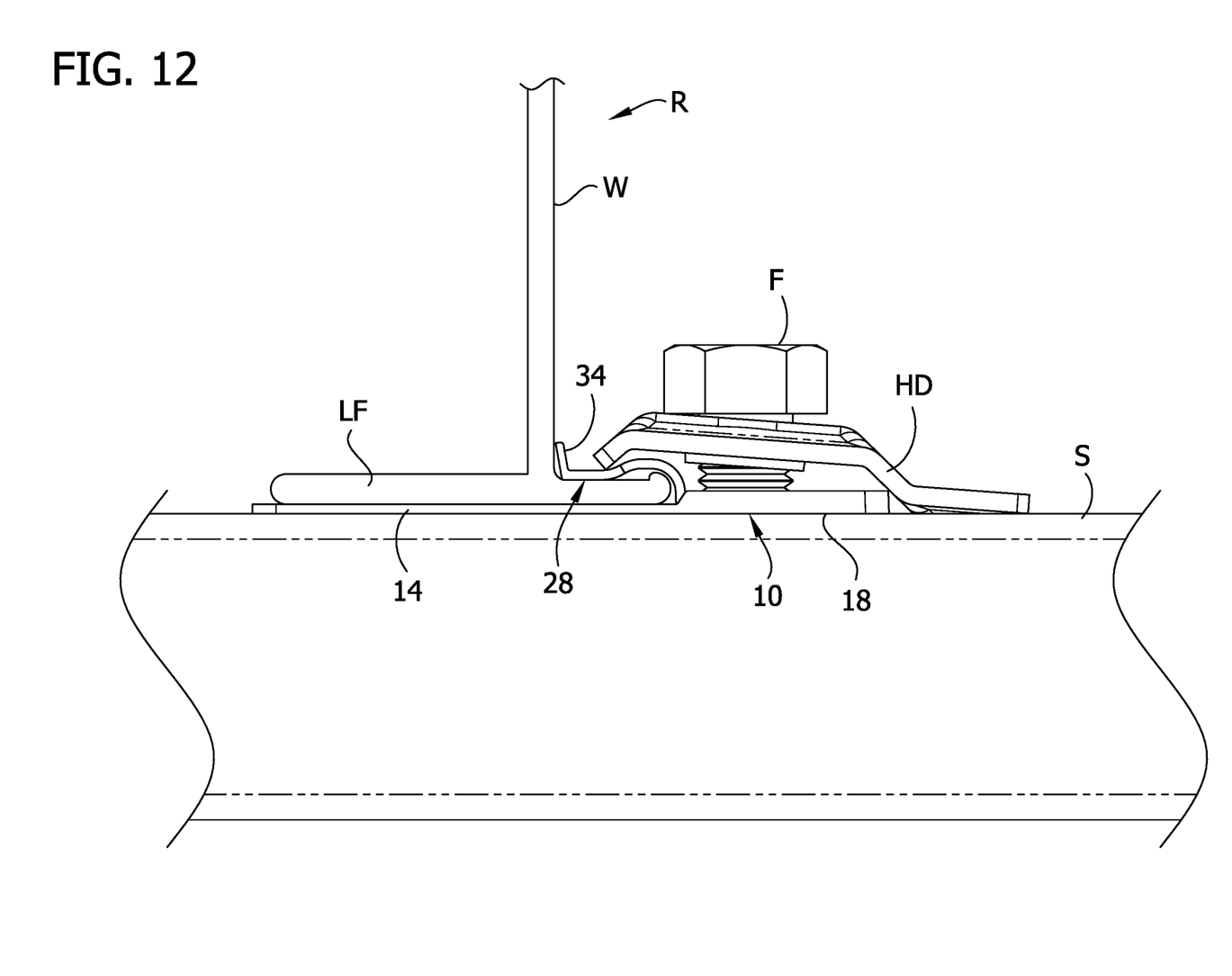
FIG. 12 is an enlarged, partial front elevational view of FIG. 11.
Figure 13:
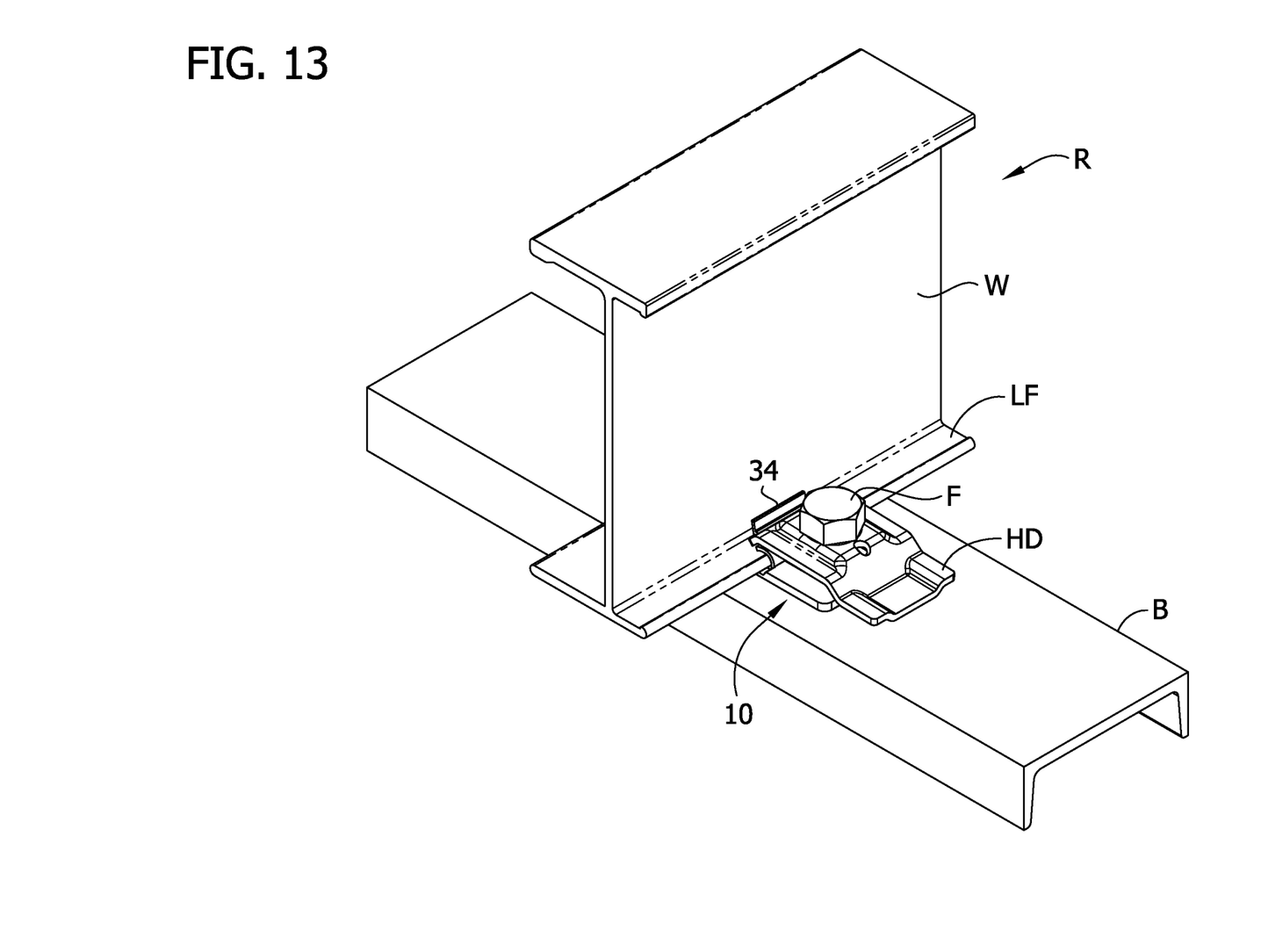
FIG. 13 is a perspective of a rail of cable tray supported on a beam, including the isolation pad separating or isolating the cable tray from the hold-down device in the clamp configuration and the beam.
Figure 14:
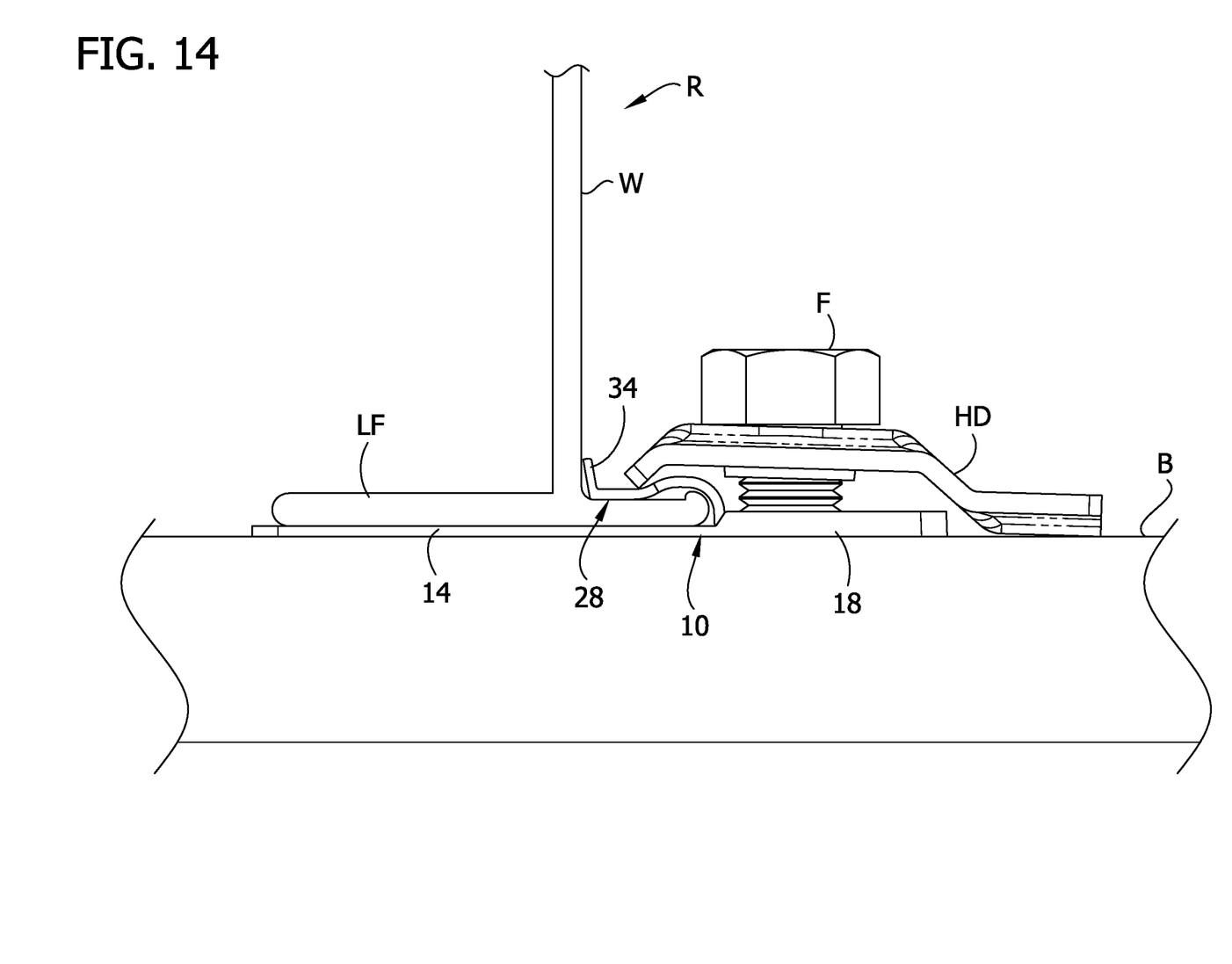
FIG. 14 is an enlarged, partial front elevational view of FIG. 13.

The isolation pad 10 further includes an isolation lip, generally indicated at 28, extending generally upward from the pad body 12. The illustrated isolation lip 28 extends from the pad body 12 at a location generally between or at the junction of the first and second longitudinal body portions 14, 18, respectively. The isolation lip 28 generally comprises a transition portion 30 coupled to the pad body 12; an upper portion 32, which may be generally planar, extending from the transition portion 28 toward the first longitudinal end 14 of the pad body; and a flange 34 extending upward adjacent a free end of the upper portion. Thus, the upper portion 32 of the lip 28 is disposed above and generally opposes the first longitudinal body portion 14 of the pad body 12, such as the central opening 24. A width of the upper portion 32 is greater adjacent the transition portion 30 and decreases adjacent the free end of the upper portion (e.g., the width steps down toward the free end, although the width may gradually taper). Together the isolation lip 28 and the first longitudinal body portion 14 define a horizontal channel sized and shaped to receive the lower flange of the rail of the cable tray therein, as shown in FIGS. 6 and 7, for example. Thus, the transition portion 30 is configured so that it is slightly taller than the height of the lower flange LF, and the upper portion 32 is configured so that the upper portion lies over the lower flange LF of the rail R, such as shown in FIGS. 6, 12, and 14, for example, to isolate the hold-down device HD from the cable tray. In this way, the isolation lip 28 is configured as a clamp/guide-isolating portion of the isolation pad 10, as explained in more detail below. The flange 34 is configured to provide a barrier between the end of the hold-down device HD (e.g., the guide) and a web W of the rail R of the cable tray to further inhibit the hold-down from contacting the cable tray. In one example, the flange 34 may be configured to abut the web W of the rail R of the cable tray.

In the illustrated embodiment the fastener opening 19 of the second longitudinal body portion 18 is configured to receive a fastener F (e.g., a bolt) that fastens the hold-down device HD and the isolation pad 10 to the mounting support. For example, the opening 19 is generally sized to receive a threaded shaft of a bolt F. The threaded shaft may be threadably coupled to a channel nut (not shown) received in the interior of the strut S, as is generally known in the art. The opening 19 has a first portion 19A for receiving the fastener F when using a clamp (e.g., a hold-down device configured as a clamp), and as second portion 19B for receiving the fastener when using a guide (e.g., a hold-down device configured as a guide). The illustrated opening 19 has a shape like the number "8" or a snowman. The opening 19 can be any desired shape, for example, the opening can be circular, oblong, rectangular, etc. The opening 19 may be generally centrally located on the second longitudinal body portion 18. The opening 19 can directly abut the transition portion 30 of the lip 28. The opening may comprise one or more openings in other embodiments, for example, two separate openings.

In the illustrated embodiment, the isolation pad 10 further includes longitudinal ribs 38 on the second longitudinal portion. The ribs 38 are spaced apart from one another and disposed on either side of the fastener opening 19. The ribs 38 extend longitudinally along the second longitudinal body portion 18 and project upward therefrom. As shown in FIG. 6, for example, the ribs 38 can facilitate locating the guide (and/or the clamp) on the isolation pad 10. Moreover, a longitudinal projection on an underside of the guide may be received between the ribs to capture the guide and inhibit rotation of the guide on the isolation pad 10.

Figure 1:
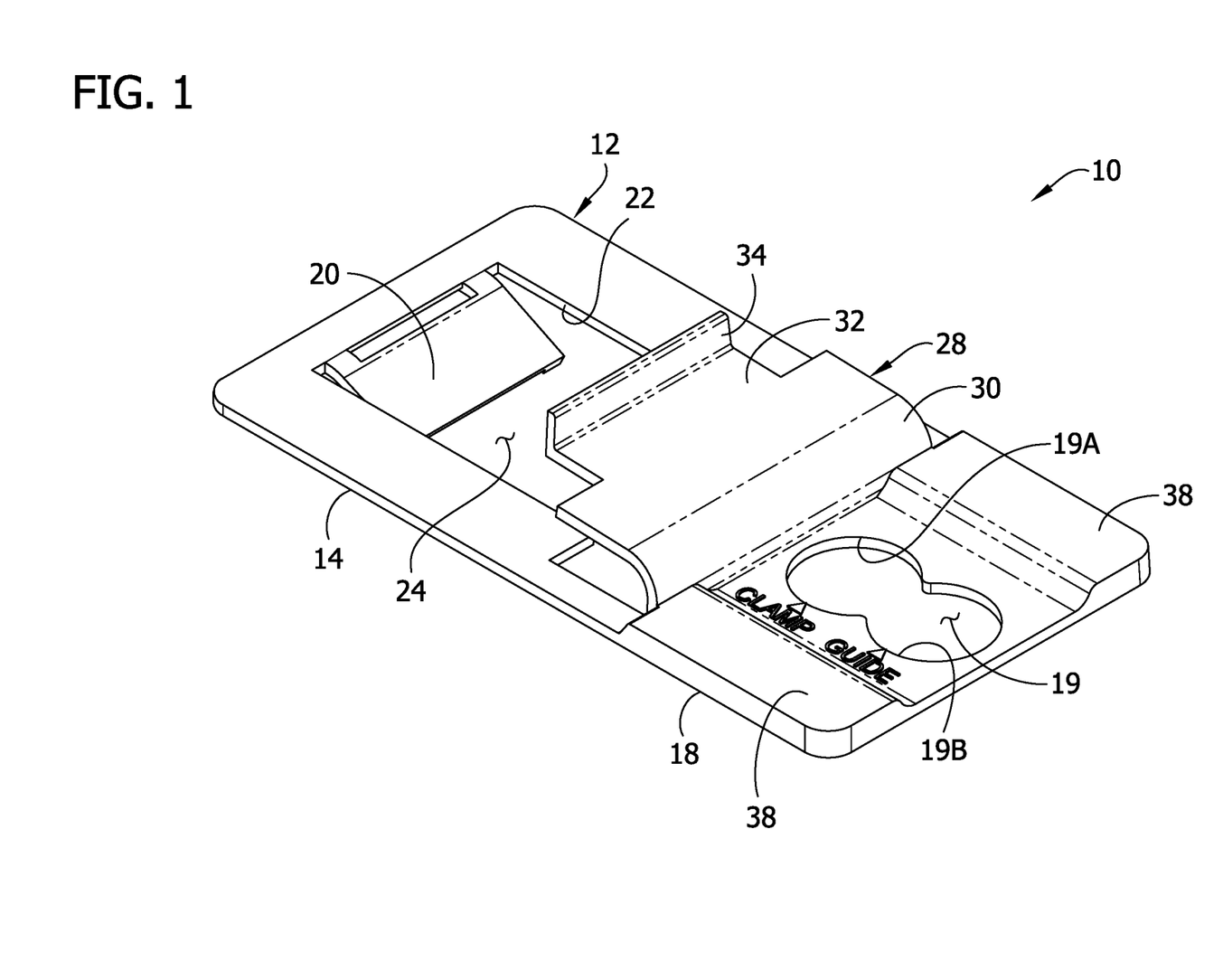
FIG. 1 is a top perspective view of one embodiment of an isolation pad for a cable tray.
Figure 2:
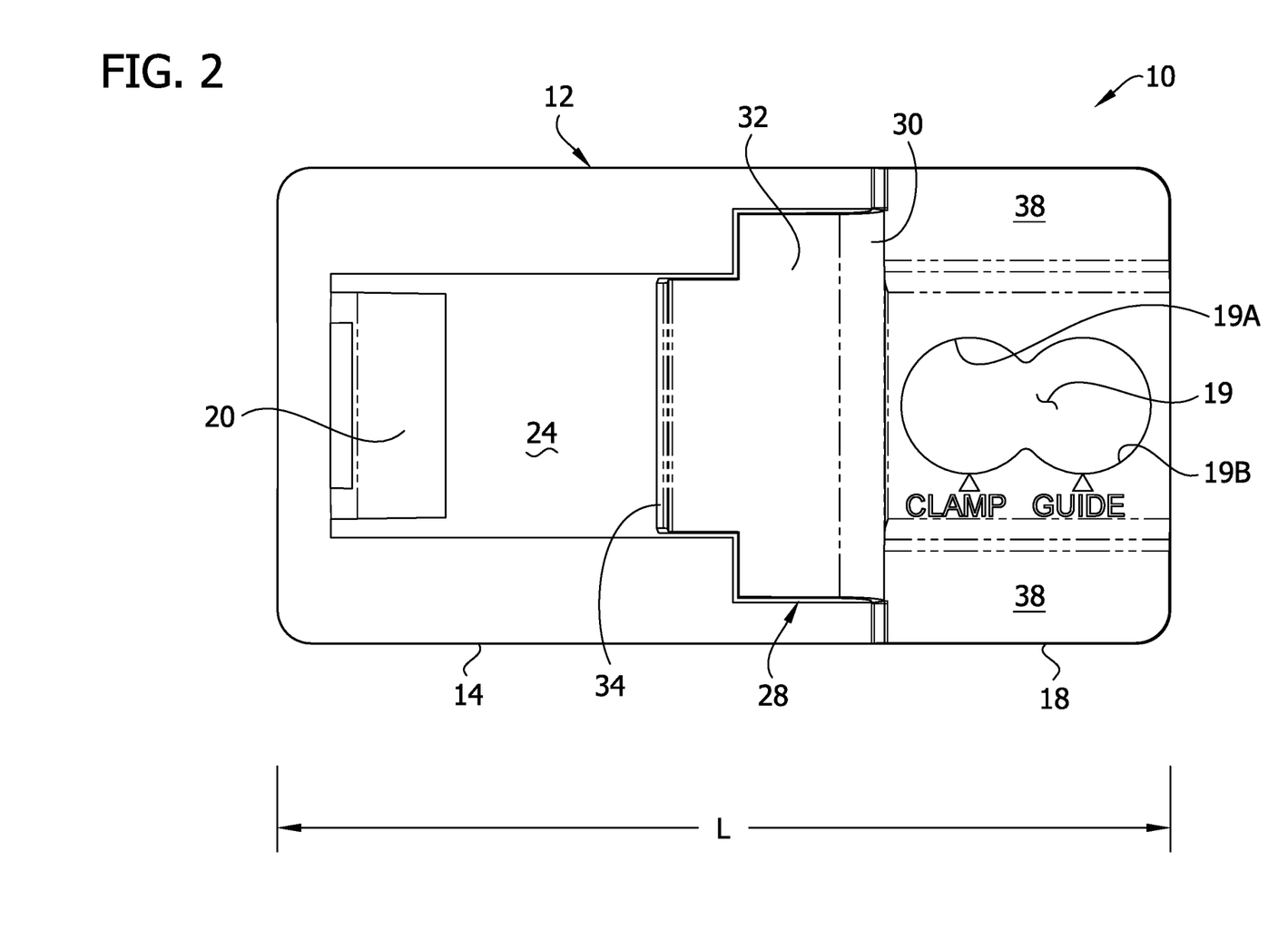
FIG. 2 is a top plan view of the isolation pad.
Figure 3:
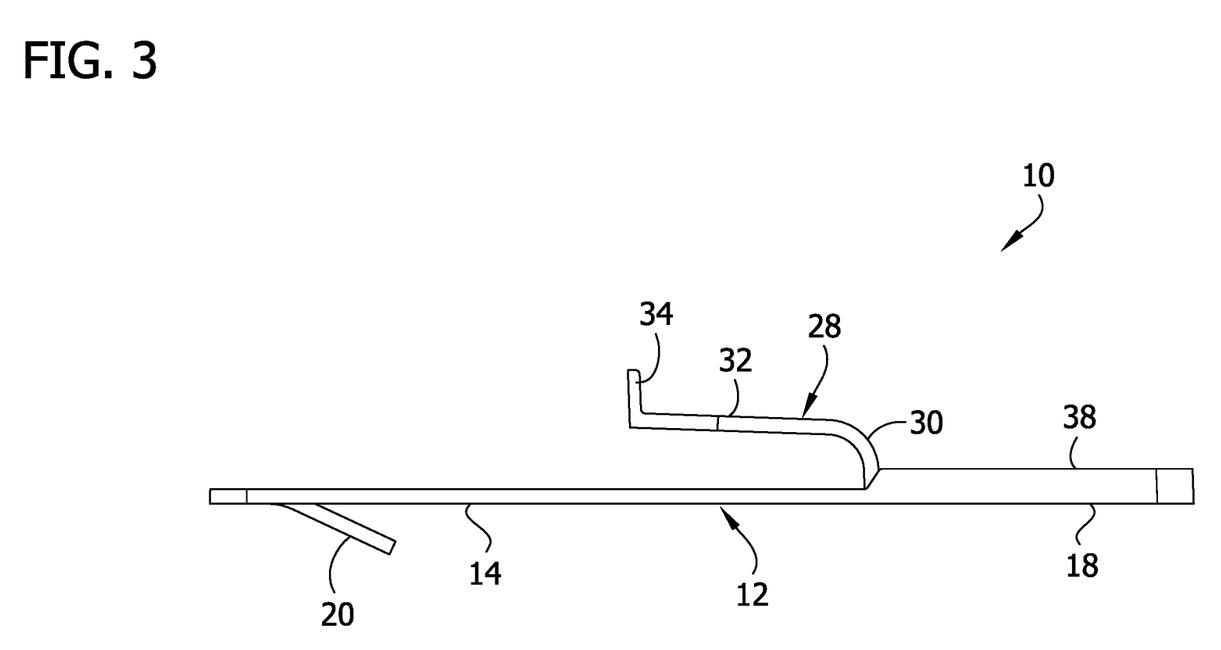
FIG. 3 is a front elevational view of the isolation pad.
Figure 4:
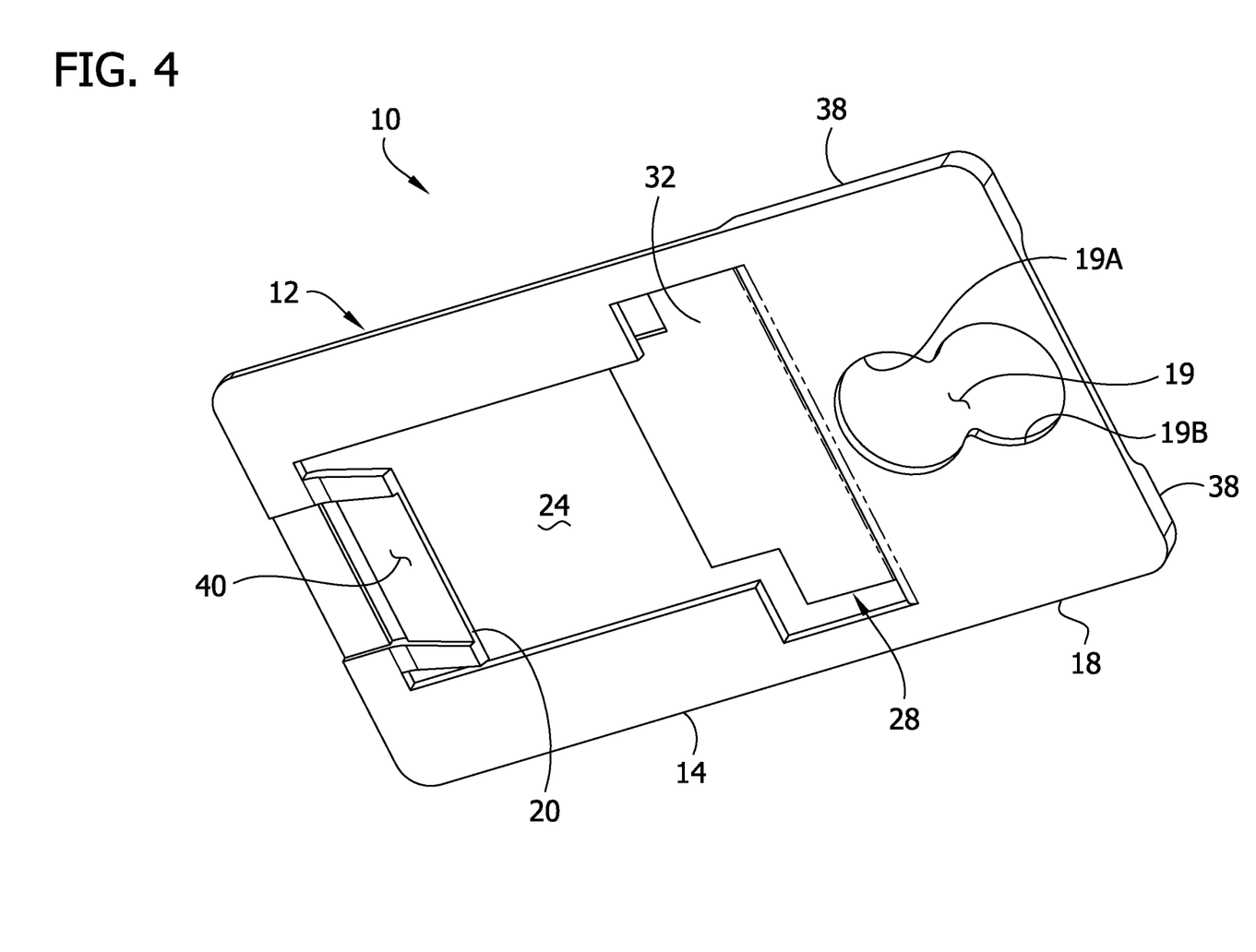
FIG. 4 is a bottom perspective of the isolation pad.

Water or other liquid (e.g., rain water or condensation) may enter the central opening 24 and pool on the solid mounting surface of the mounting support (e.g., the beam B). Referring to FIG. 4, the illustrated isolation pad 10 has one or more channels, grooves, and/or indentations (broadly, recesses 40) on a lower surface or underside of the pad to allow egress of water or other liquid that has entered one or more openings of the pad (e.g., the central opening 24 and/or the fastener opening 19). In the illustrated embodiment, an underside of the tab 20 and a longitudinal end of the pad body 12 at the first longitudinal portion 14 together define a channel 40 that communicates with the central opening 24 when the tab rests against a solid mounting surface of the mounting support. The channel 40 allows liquid that has entered the central opening to egress to inhibit pooling on the mounting surface. In one or more other embodiments, one or more of the channels, grooves, and/or recesses may be defined at other locations on the pad 10, for example, other locations on the underside of the pad body.

The isolation pad 10 may be formed as a one-piece, monolithic component, as illustrated, although the isolation pad 10 may comprise separate components secured to one another after individually forming the components. In one example, the isolation pad 10 may be formed from a suitable material that does not galvanically react when in contact with metal surfaces. For example, the isolation pad 10 may be formed from plastic. In one example, the isolation pad 10 can be formed from a thermoplastic polymer, for example, high density polyethylene (HDPE). The thermoplastic polymer or other material used for the isolation pad 10 can be injection molded to preform the isolation pad 10. As used herein, the isolation pad being "preformed" means that its functional form, as shown through the drawings and described herein, is made before shipping to the job site, and in one embodiment, its functional form is made by injection molding. This design allows for ease of use without the required onsite configuration of previous designs.

In the illustrated embodiment, the hold-down device HD is constructed as a single, one-piece combination component that can be used as either the clamp or the guide. The hold-down device HD is selectively configurable between the clamp and the guide by inverting and rotating the hold-down device HD, as can be seen from FIGS. 6 and 12. It is understood that in other embodiments the clamp and the guide may be separate components. The isolation pad 10 is suitable for use with separate clamp and guide components.

Figure 5:
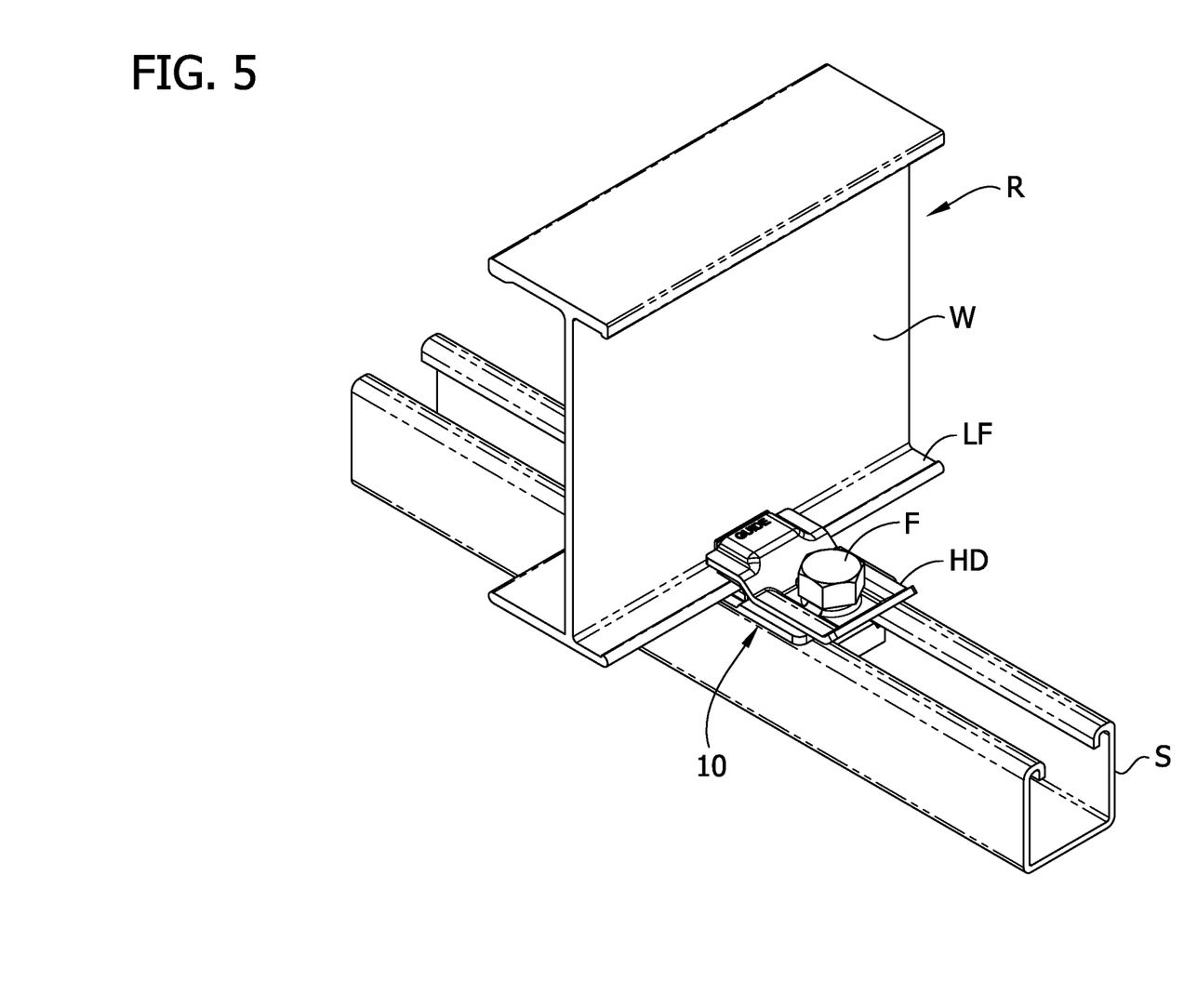
FIG. 5 is perspective of a rail of cable tray supported on a strut, including the isolation pad separating or isolating the cable tray from the hold-down device in a guide configuration and the strut.
Figure 9:
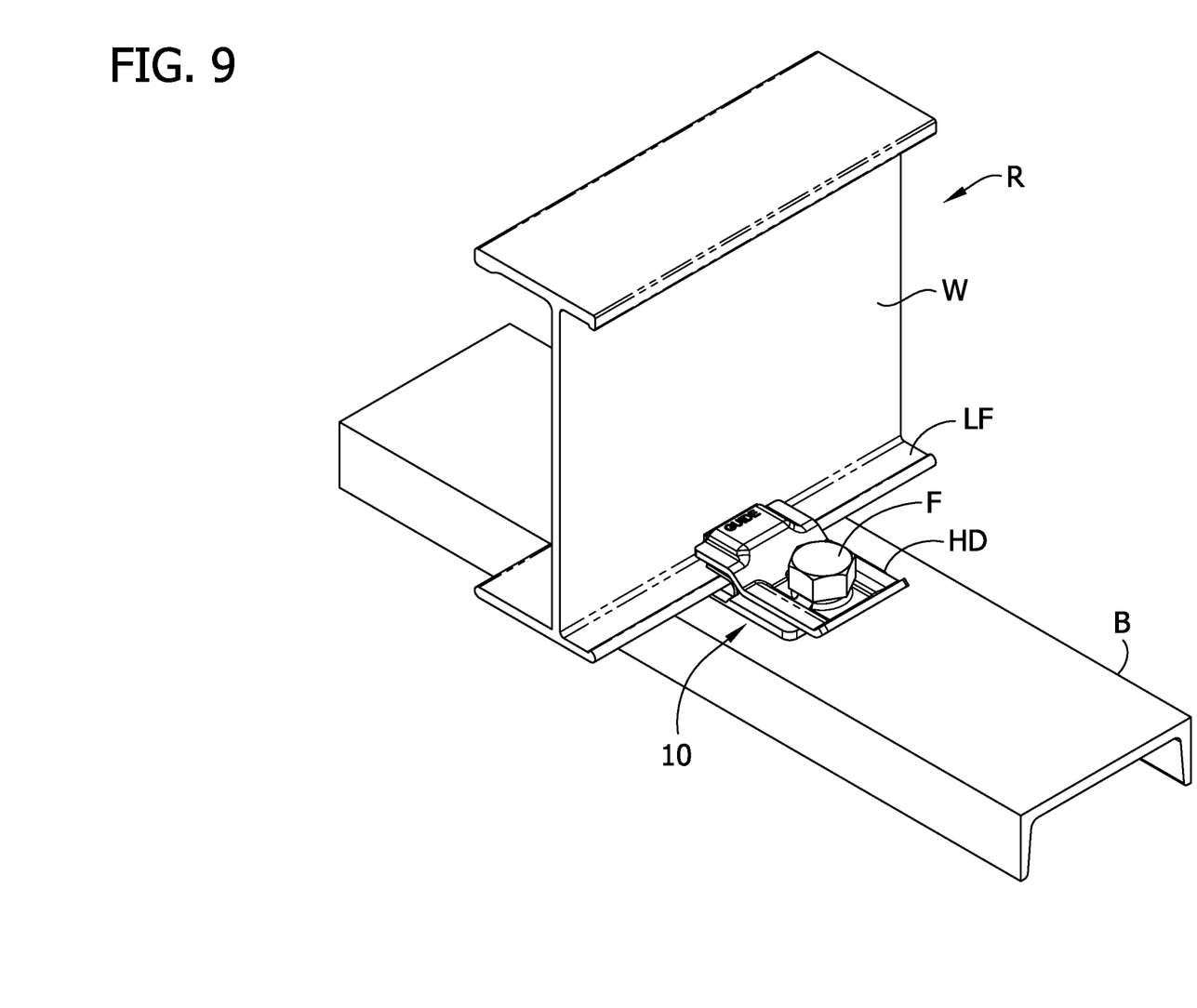
FIG. 9 is a perspective of a rail of cable tray supported on a beam, including the isolation pad separating or isolating the cable tray from the hold-down device in the guide configuration and the beam.

FIGS. 5, 6, and 9 demonstrate the isolation pad 10 in use with a cable tray assembly, which includes the cable tray with the rail R, the mounting support (i.e., the strut S in FIGS. 5 and 6; the beam B in FIG. 9), and the hold-down device HD in the guide configuration. The isolation pad 10 rests between the lower flange LF of the rail R and the mounting surface of mounting support (i.e., the strut S or the beam B, for example). Referring to FIG. 8, when the strut S is used, the tab 20 of the isolation pad 10 can inserted into the open, upper slot of the strut S to inhibit lateral movement of the isolation pad 10 of the upper surface of the strut. Moreover, the threaded shaft of the fastener 50 may be threadably coupled to a channel nut received in the interior of the strut S. Referring to FIGS. 9 and 10, when the beam B (or other mounting support with a solid mounting surface) is used, the tab 20 is deflected or pivoted upward into the central opening 24 and generally parallel to the pad body 12. In each application, the lower flange LF of the rail R is received in the channel defined by the isolation lip 28 and the pad body 12 so that the isolation lip is disposed over and generally opposes the lower flange of the rail. The hold-down device HD is configured as the guide over the isolation pad 10 and the planar end portion of the hold-down device HD is generally parallel to and/or on top of the isolation lip 28 of the isolation pad 10. The fastener F (e.g., bolt) of the hold-down device HD is inserted through the fastener opening 19 (i.e., the second or guide portion of the opening) of the isolation pad 10. Through this arrangement, the lower flange LF is isolated physically from both the mounting support (e.g., strut S or beam B) and the hold-down device HD by use of the isolation pad.

FIGS. 11-14 demonstrate the isolation pad 10 in use with a cable tray assembly, which includes the cable tray with the rail R, the mounting support (i.e., the strut S in FIGS. 11 and 12; the beam B in FIGS. 13 and 14), and the hold-down device HD in the clamp configuration. The isolation pad 10 rests between the lower flange LF of the rail R and the mounting surface of mounting support (i.e., the strut S or the beam B, for example). As can be seen, the configuration, orientation, arrangement, etc., of the isolation pad 10 is the same as when the hold-down device HD is in the guide configuration, explained above. The isolation pad 10 rests between the lower flange LF of the rail R and the mounting surface of mounting support (i.e., the strut S or the beam B, for example). Referring to FIG. 8, when the strut S is used, the tab 20 of the isolation pad 10 can inserted into the open, upper slot of the strut S to align the isolation pad 10 on the strut and/or inhibit lateral movement of the isolation pad 10 of the upper surface of the strut. Moreover, the threaded shaft of the fastener 50 may be threadably coupled to a channel nut received in the interior of the strut S. Referring to FIG. 10, when the beam B (or other mounting support with a solid mounting surface) is used, the tab 20 is deflected or pivoted upward into the central opening 24 and generally parallel to the pad body 12. In each application, the lower flange LF of the rail R is received in the channel defined by the isolation lip 28 and the pad body 12 so that the isolation lip is disposed over and generally opposes the lower flange of the rail. The hold-down device HD is configured as the clamp so that a downward-facing flange of the hold-down device HD engages the upper portion 32 of the isolation lip 28 of the isolation pad 10 to sandwich the isolation lip 28 between the downward-facing flange of the hold-down device HD and the lower flange LF and clamp the rail R on the mounting support (e.g., the strut S or beam B). The fastener F (e.g., bolt) of the hold-down device HD is inserted through the fastener opening 19 (i.e., the first or clamping portion of the fastening opening) of the isolation pad 10. Through this arrangement, the lower flange LF is isolated physically from both the mounting support (e.g., strut S or beam B) and the hold-down device HD by use of the isolation pad.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

The invention claimed is:

1. An isolation pad for a cable tray comprising:
a pad body which is substantially planar, the pad body having opposite first and second longitudinal body portions, wherein the first longitudinal portion is configured to be sandwiched between the cable tray and a mounting support, wherein the second longitudinal body portion defines a fastener opening configured to receive a fastener therethrough; and
an isolation lip extending generally upward from the pad body, the isolation lip includes an upper portion which generally opposes the first longitudinal body portion,
an opening in the pad body defined by an interior perimeter at the first longitudinal body portion,
an alignment projection extending generally downward from the interior perimeter defining the opening in the pad body and configured to be received in an open slot of a strut to align the isolation pad on the strut,
wherein the alignment projection is configured to be pivoted upward into the opening in the pad body about a living hinge,
wherein the first longitudinal body portion defines the opening, wherein the upper portion of the isolation lip generally opposes the opening,
wherein the isolation pad has an upper face, and a lower face, the isolation pad defining a recess on the lower face and in communication with the opening to allow liquid in the opening to egress through the recess.

2. The isolation pad of claim 1, wherein the isolation lip has a second end attached to the pad body and a first end free from attachment to the pad body.

3. The isolation pad set forth in claim 2, further comprising a flange extending upward from the first end of the isolation lip.

4. The isolation pad set forth in claim 1, wherein the pad body and the isolation lip are formed from a polymeric material.

5. The isolation pad set forth in claim 4, wherein the pad body and the isolation lip are formed from a thermoplastic polymer.

6. The isolation pad set forth in claim 5, wherein the pad body and the isolation lip are formed from high density polyethylene (HDPE).

7. The isolation pad set forth in claim 1, wherein the alignment projection comprises a tab that is pivotably coupled to pad body.

8. The isolation pad set forth in claim 1, wherein the alignment projection is generally adjacent a first longitudinal end of the pad body.

9. The isolation pad set forth in claim 1, further comprising ribs projecting upward from the second longitudinal body portion and extending longitudinally on either side of the fastener opening.

10. The isolation pad set forth in claim 1, wherein the alignment projection is preformed and injection-molded with the pad body to form an integral, one-piece structure.

11. The isolation pad set forth in claim 10, wherein the living hinge pivotably couples the alignment projection to the interior perimeter defining the opening.

* * * * *